United States Patent
Liu

(10) Patent No.: US 11,089,226 B2
(45) Date of Patent: Aug. 10, 2021

(54) CAMERA MODULE, TERMINAL DEVICE WITH PROTRUSIBLE CAMERA, AND IMAGE CAPTURING METHOD

(71) Applicant: BEIJING XIAOMI MOBILE SOFTWARE CO., LTD., Beijing (CN)

(72) Inventor: Zhenhua Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 54 days.

(21) Appl. No.: 16/693,366

(22) Filed: Nov. 24, 2019

(65) Prior Publication Data

US 2021/0051272 A1 Feb. 18, 2021

(30) Foreign Application Priority Data

Aug. 15, 2019 (CN) .......................... 201910753242.0

(51) Int. Cl.
*H04N 5/232* (2006.01)
*G06F 1/16* (2006.01)
*H04M 1/02* (2006.01)

(52) U.S. Cl.
CPC ....... *H04N 5/23299* (2018.08); *G06F 1/1686* (2013.01); *H04M 1/0264* (2013.01)

(58) Field of Classification Search
CPC ............ H04N 5/23299; H04N 5/2257; H04N 5/2251; G06F 1/1686; H04M 1/0264; H04M 2250/20; H04M 1/0235
See application file for complete search history.

(56) References Cited

U.S. PATENT DOCUMENTS

| 10,021,296 | B2* | 7/2018 | Fan | ...................... H04N 5/2251 |
| 2013/0162591 | A1* | 6/2013 | Hidaka | ............... H04M 1/0266 345/174 |
| 2015/0331221 | A1* | 11/2015 | Koiwai | .................. G02B 7/102 359/701 |
| 2019/0014201 | A1 | 1/2019 | Bao | |
| 2019/0253543 | A1* | 8/2019 | Fan | ...................... H05K 5/0086 |

FOREIGN PATENT DOCUMENTS

| CN | 105554196 A | | 5/2016 |
| CN | 106254581 | * | 12/2016 |
| CN | 106254581 A | | 12/2016 |
| CN | 103546687 B | | 4/2017 |
| CN | 109302552 | * | 2/2019 |
| CN | 109302552 A | | 2/2019 |
| CN | 110035213 | * | 7/2019 |
| CN | 110035213 A | | 7/2019 |
| CN | 110099147 A | | 8/2019 |

OTHER PUBLICATIONS

OA for EP Application 20150904.9-1208 (EESR), mailed on May 6, 2020.

* cited by examiner

*Primary Examiner* — Luong T Nguyen
(74) *Attorney, Agent, or Firm* — Syncoda LLC; Feng Ma

(57) ABSTRACT

A camera module includes a camera assembly, a first driving assembly, and a second driving assembly. The second driving assembly is configured to drive the camera assembly and the first driving assembly to move in a first direction. The first driving assembly is configured to drive the camera assembly to rotate. The first driving assembly includes a first electric motor, a first power output element, and a first transmission drivingly connecting the first electric motor to the first power output element. The camera assembly is mounted to the first power output element.

17 Claims, 12 Drawing Sheets

CAMERA MODULE, TERMINAL DEVICE WITH PROTRUSIBLE CAMERA, AND IMAGE CAPTURING METHOD

CROSS-REFERENCE TO RELATED APPLICATION

This application claims priority to Chinese Patent Application Serial No. 201910753242.0, filed on Aug. 15, 2019, the disclosure of which is hereby incorporated by reference in its entirety.

BACKGROUND

Currently, terminal devices, such as mobile phones, have entered an era where a full screen has become a trend. A screen-to-body ratio close to 100% has been realized in some mobile devices.

SUMMARY

The present disclosure relates generally to a technical field of electronic devices, more specifically to a camera module, a terminal device, and an image capturing method.

Various embodiments of the present disclosure provide a camera module, a terminal device, and an image capturing method with a high screen-to-body ratio and a low cost.

In a first aspect, some embodiments of the present disclosure provide a camera module. The camera module includes a camera assembly, a first driving assembly and a second driving assembly. The second driving assembly is configured to drive the camera assembly and the first driving assembly to move in a first direction. The first driving assembly is configured to drive the camera assembly to rotate. The first driving assembly includes a first electric motor, a first power output element, and a first transmission drivingly connecting the first electric motor to the first power output element. The camera assembly is secured to the first power output element.

In a second aspect, some embodiments of the present disclosure provide a terminal device including a body and a camera module. The body includes a casing and a support frame mounted to the casing. The camera module includes: a bracket connected to the support, a camera assembly, first driving assembly configured to drive the camera assembly to rotate and comprising a first electric motor, a first power output element, a first transmission, and a first reduction part, the first electric motor, the first power output element, and the first transmission being mounted to the first reduction part, and the camera assembly is secured to the first power output element; and a second driving assembly configured to drive the camera assembly to enable the camera assembly to at least partially protrude from the body and comprising a second electric motor secured to the body through a threaded structure.

In a third aspect, some embodiments of the present disclosure provide an image capturing method for a terminal device including a body and a camera module. The camera module incudes: a camera assembly; a first driving assembly configured to drive the camera assembly to rotate and comprising a first electric motor, a first power output element, and a first transmission drivingly connecting the first electric motor to the first power output element, and the camera assembly being secured to the first power output element; and a second driving assembly configured to drive the camera assembly and the first driving assembly to move in a first direction. The image capturing method includes: acquiring an instruction for a front image capturing function triggered by a user; starting the second driving assembly to drive the camera assembly to move in the first direction to enable the camera assembly to at least partially protrude from the body; starting the first driving assembly to drive the camera assembly to rotate by a preset angle, the preset angle satisfying the front image capturing function; and capturing a target image with the camera assembly.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
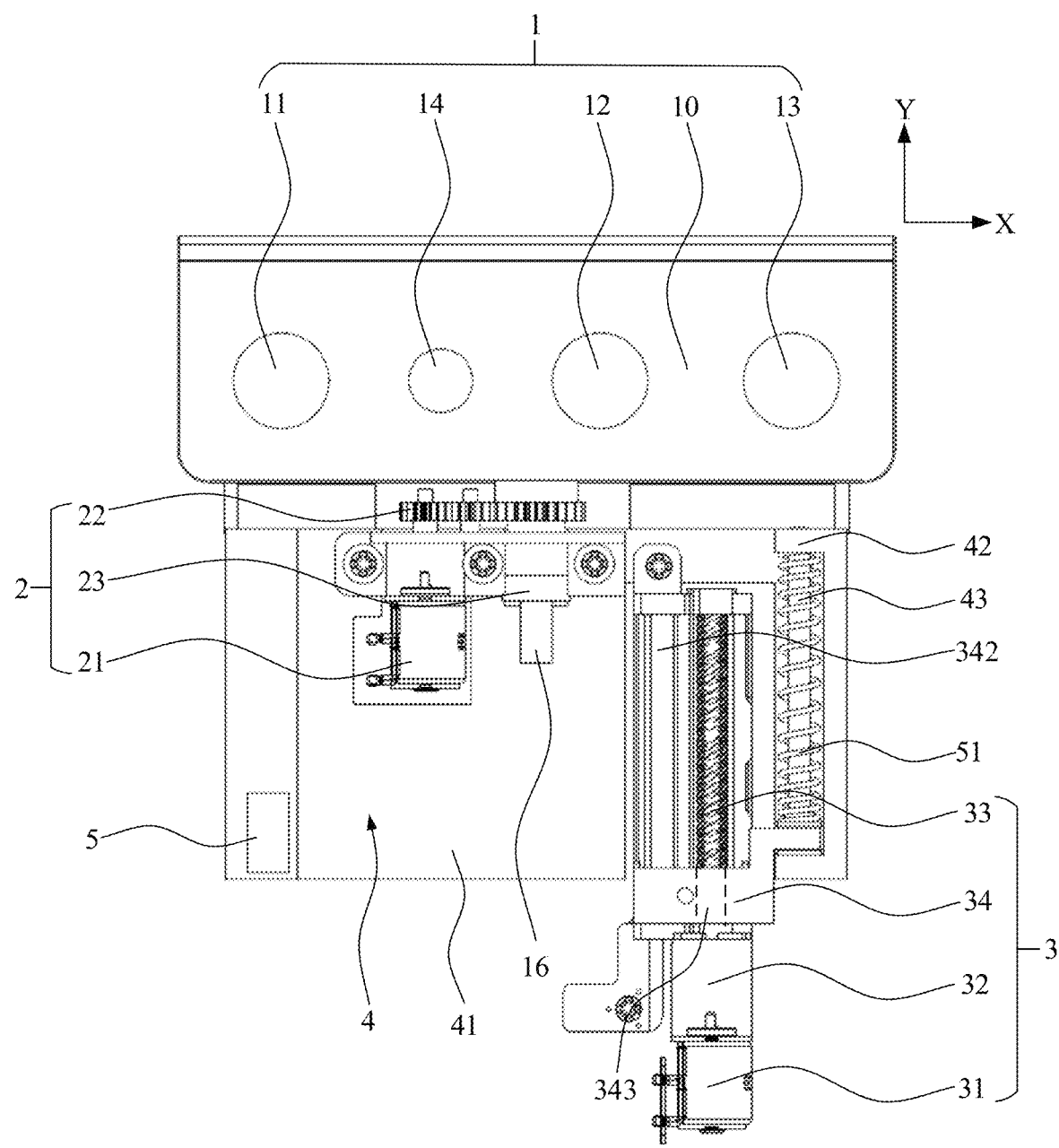
FIG. 1 is a front view of an embodiment of a camera module of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

The terms used in the present disclosure are only for purpose of description of specific embodiments, and not intended to limit the present disclosure. Unless otherwise defined, technological terms or scientific terms used herein should be interpreted as an ordinary meaning that can be understood by a person skilled in the art. The words "first," "second" or the similar words used in the specification and claims of the preset application do not represent any order, number or importance, but only for distinguishing different constituent parts. Similarly, "a," "an" or similar words do not also represent number limitation, but represent that there is at least one. The words "a plurality of" or "several" represent two or more than two. Unless otherwise indicated, the words "front part," "rear part," "lower part" and/or "upper part" or the like are only for convenience of description, but not intended to be limited to one position or one spatial orientation. The words "include," "comprise" or the like are intended to mean that the element or object before "include" or "comprise" covers the listed elements, objects or their equivalents after "include" or "comprise" and do not exclude other elements or objects. The words "connect," "couple" or the like are not limited to physical or mechanical connections, but can includes electrical connection, regardless of direct or indirect connection. The words in a singular form, such as "a," "the," "this" used in the specification and appended claims of the present disclosure are also intended to include a plural form, unless they are explicitly indicated in the context to represent other meanings. It should also be understood that, the term "and/or" used herein refers to include any or all possible combinations of one or more listed associated items.

The various device components, modules, units, blocks, or parts may have modular configurations, or are composed of discrete components, but nonetheless can be referred to as "modules" in general. In other words, the "components," "parts," "modules" or "units" referred to herein may or may not be in modular forms.

Various embodiments of the present disclosure can address some factors affecting the screen-to-body ratio. For example, a camera, a sensor, or other components typically arranged at a front side of the mobile phone can affect the screen-to-body ratio of the terminal device. A front camera of the terminal device generally has a poorer imaging effect compared with a rear camera. If the imaging effect of the front camera is improved by increasing the lens size, the cost is inevitably increased, and the screen-to-body ratio is also greatly affected due to the increased size of the front camera.

Referring to FIGS. 1 through 12, some embodiments of the present disclosure provide a camera module, a terminal device, and an image capturing method. The terminal device is device having a display screen, such as a mobile phone, a tablet computer, an on-vehicle device, etc. The camera module includes a camera assembly, a first driving assembly, and a second driving assembly. The second driving assembly is configured to drive the camera assembly and the first driving assembly to move in a first direction to enable the camera assembly to at least partially protrude from a body. The first driving assembly is configured to drive the camera assembly to rotate. The first driving assembly includes a first electric motor, a first power output element, and a first transmission drivingly connecting the first electric motor to the first power output element, and the camera assembly is fixed to the first power output element.

Various embodiments of the present disclosure further provide a terminal device including a body and a camera module. The body includes a casing and a support frame mounted to the casing. The camera module includes: a bracket connected to the support, a camera assembly, first driving assembly configured to drive the camera assembly to rotate and comprising a first electric motor, a first power output element, a first transmission, and a first reduction part, the first electric motor, the first power output element, and the first transmission being mounted to the first reduction part, and the camera assembly is secured to the first power output element; and a second driving assembly configured to drive the camera assembly to enable the camera assembly to at least partially protrude from the body and comprising a second electric motor secured to the body through a threaded structure.

In some embodiments of the present disclosure, a common front-rear camera is achieved by rotating the camera assembly, the cost can be reduced while ensuring imaging quality of the camera, and furthermore a front camera is canceled, thereby facilitating increase in a screen-to-body ratio of the terminal device. Additionally, the power is transmitted to the camera assembly through the first transmission and the power output element, compared with directly driving the camera assembly through an electric motor, the first driving assembly can ensure high and stable transmission, avoid tilting and waggling of the camera assembly during movement which will affect a final position of the camera assembly after protruding from the body and thus affecting quality of an obtained image.

Figure 2:
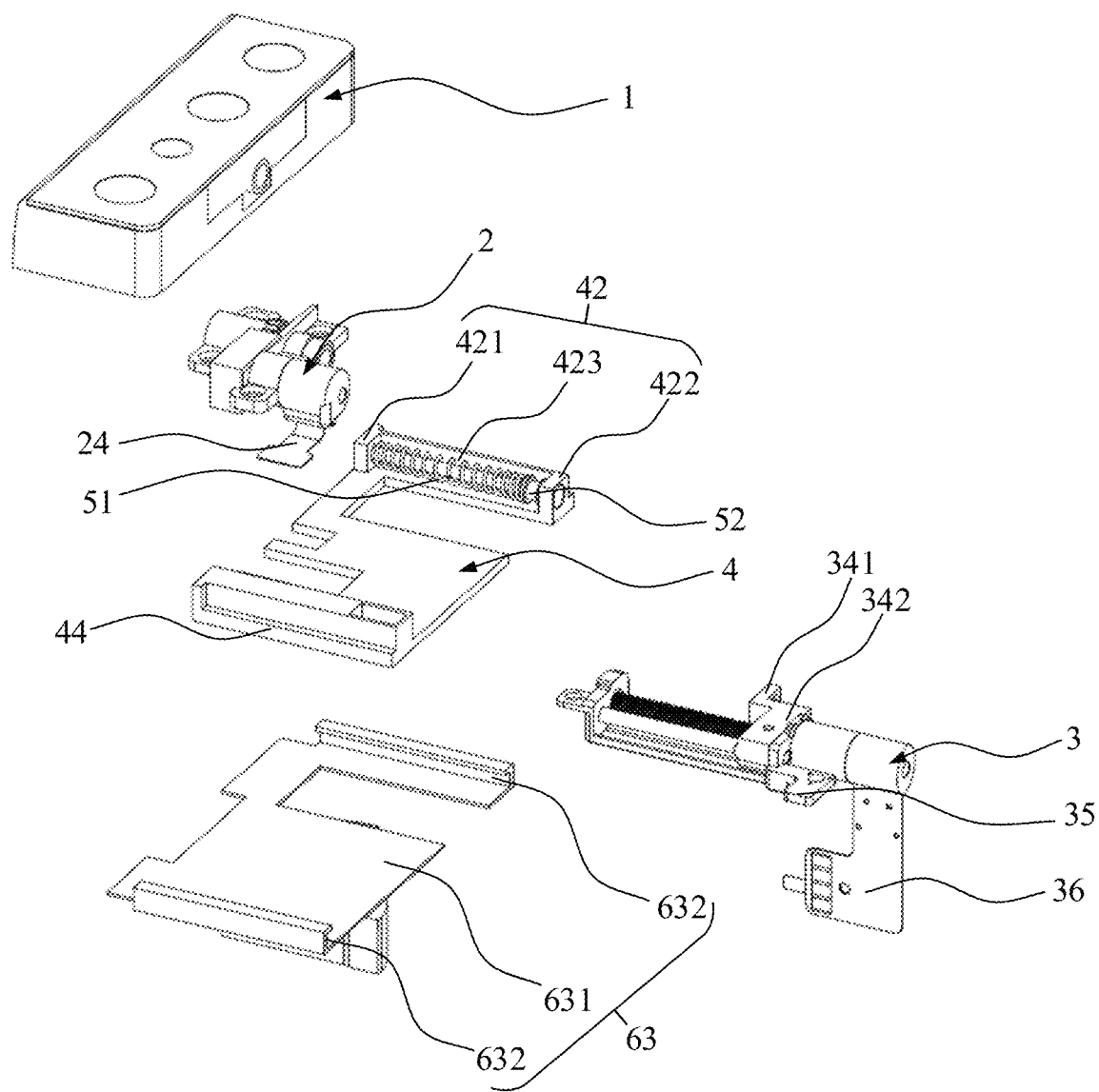
FIG. 2 is an exploded view of the camera module illustrated in FIG. 1.
Figure 3:
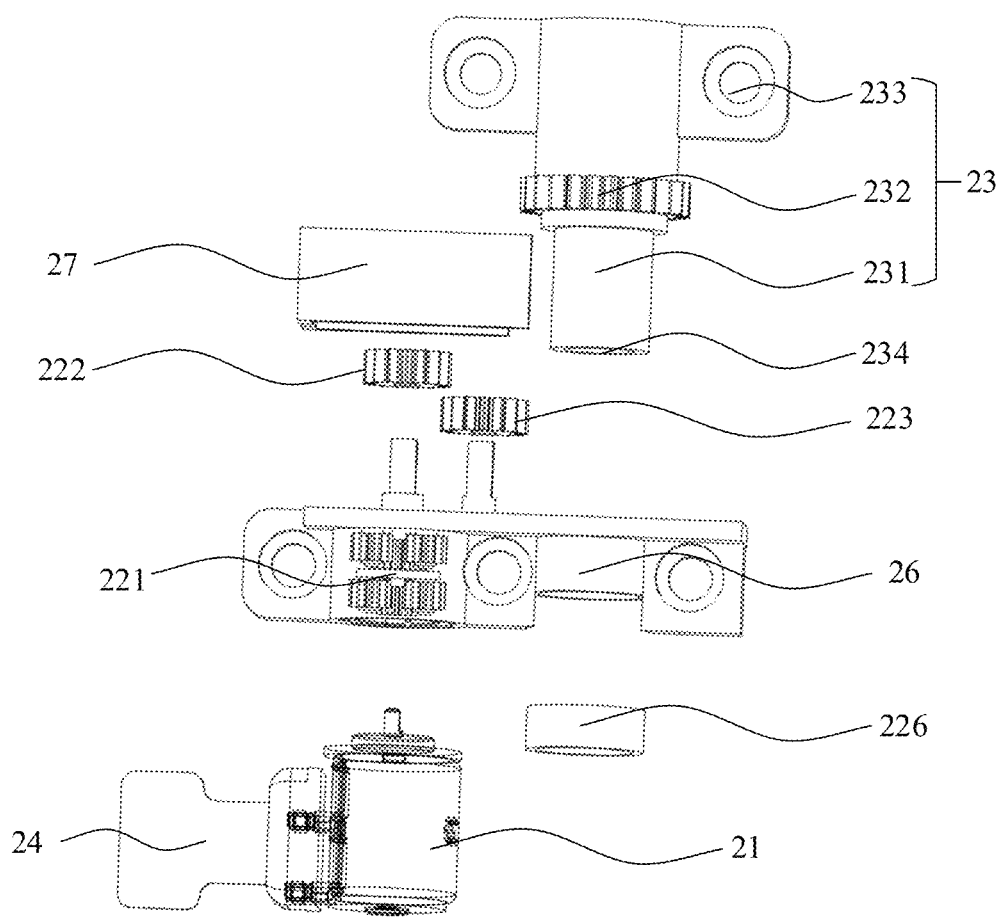
FIG. 3 is an exploded perspective view of a first driving assembly of the camera module illustrated in FIG. 1.

As illustrated in FIGS. 1 through 3, for example, the terminal device of the present embodiment is a mobile phone, the body can be understood as a total of the remaining elements of the mobile phone except the camera assembly. The camera module includes a camera assembly 1, a first driving assembly 2, a second driving assembly 3, and a bracket 4. The first driving assembly 2 is mounted to the bracket 4. The second driving assembly 3 is configured to drive the bracket 4, the camera assembly 1, and the first driving assembly 2 to move in a first direction Y, such that the camera assembly 1 at least partially protrudes from the body. The first driving assembly 2 is configured to drive the camera assembly 1 to rotate after the camera assembly 1 protrudes from the body. It could be understood that, in a process that the camera assembly restores to an original position, the second driving assembly 3 is configured to drive the bracket 4, the camera assembly 1, and the first driving assembly 2 to move in an opposite direction of the first direction Y.

The camera assembly 1 includes a housing 10, a first camera 11, a second camera 12, a third camera 13, a sensor 14, and a cable 16 which are mounted to the housing 10. The housing 10 extends in a second direction X, the first camera 11, the sensor 14, the second camera 12, and the third camera 13 are sequentially arranged in the second direction X. The second direction X is perpendicular to the first direction Y. A plurality of cameras are arranged in the second direction X, thereby facilitating reduction of a size of the camera assembly in the first direction Y. The first camera 11 is a main camera, the second camera 12 is a wide-angle auxiliary camera, and the third camera 13 is a black-and-white auxiliary camera. For example, the sensor 14 is an optical sensor, an infrared sensor, etc. In other embodiments, one, two or four cameras can be provided, and a plurality of sensors can be provided. The specific number can be selected according to the requirements of the user, and the cameras can also be arranged in the first direction Y. The cable 16 is electrically coupled with each of the cameras (or rather an electronic element in each of the cameras), and the cable 16 is configured to transmit data between the cameras or other elements and a main board of the body. The cable 16 can be a flexible cable. Certainly, the camera assembly 1 can also include a breathing light, an infrared remote control, or other components.

As illustrated in FIG. 2, in the present embodiment, the camera module also includes a receiver 15 (referring to reference numeral illustrated in FIGS. 6 and 10) and a flash lamp (not illustrated). The receiver 15 is mounted to the housing 10 and located adjacent to an upper end face of the housing 10 (the up-and-down direction is the first direction Y), and the flash lamp is also mounted to the housing of the camera assembly. In other embodiments, the receiver 15 and the flash lamp can also be mounted to the bracket 4. Since the receiver is arranged at the camera module instead of the body, the display screen can extend to an area originally configured to be provided with the receiver, thereby further facilitating improvement of the screen-to-body ratio of the mobile phone.

The first driving assembly 2 is configured to drive the camera assembly 1 to rotate, and a rotating axis extends in the first direction Y. The first driving assembly 2 includes a first electric motor 21, a first transmission 22, and a first power output element 23. The first transmission 22 drivingly connects the first electric motor 21 to the first power output element 23, and the camera assembly 1 is secured to the first power output element 22, such that the power from the first electric motor 21 is transmitted to the camera assembly 1, so as to drive the camera assembly 1 to rotate. The first electric motor 21 is secured to the bracket 4 by a threaded structure (a screw or bolt, and a nut). Specifically, the first electric motor 21 is mounted to a first reduction box 26 and secured to the bracket 4 together with the first reduction box 26 by the threaded structure (a screw or bolt, and a nut), and this mounting structure is more stable. A first flexible printed circuit board 24 is configured to electrically couple the first electric motor 21 with the main board of the mobile phone to achieve transmission of the electric power and data for the first electric motor 21. The main board controls the first electric motor through the first flexible printed circuit board 24.

A direct current stepping motor is chosen as the first electric motor 21 of the present embodiment choses. In an un-overloading situation, a rotation speed and a stop position of the electric motor only depend on the frequency of a pulse signal and the number of pulses rather than a changing load. When a stepping driver receives one pulse signal, the stepping motor is driven to rotate by a constant angle in a set direction. The rotation of the stepping motor operates step by step with the constant angle. Therefore, an angular displacement can be controlled with the number of the pulses, thereby achieving the purpose of accurate positioning. Additionally, the rotation speed and acceleration of the electric motor can be controlled with the frequency of the pulse, thereby achieving the purpose of speed adjustment.

In some embodiments, the first transmission 22 includes a first reduction part 221 and a gear set connected to the first reduction part 221, and the gear set is configured to transfer the power from the first electric motor 21 to the first power output element 23. The first reduction part 221 is mounted in the first reduction box 26.

The first power output element 23 includes a main body part 231, a toothed part 232 extending in a circumferential direction of the main body part 231, and a mounting part 233 connected to the main body part. The mounting part 233 is configured to be secured to the camera assembly 1, and the toothed part 232 meshes with a second gear 223, so as to drive the first power output element 23 to rotate. A first gear 222, the second gear 223, and the toothed part 232 are arranged in the second direction X. The main body part 231 defines a through hole 234 extending in the first direction Y, and the rotating axis of the camera assembly 1 passes through the through hole 234. The cable 16 passes through the through hole 234, i.e. the cable 16 substantively coincides with the rotating axis of the camera assembly 1. When the camera assembly 1 rotates, the cable 16 only undergoes slight torsional deformation, the quantity of the deformation is small, and thus the cable 16 is not easy to be damaged due to bending.

The first driving assembly 2 also includes a positioning sleeve 226 configured to mount the first power output element 23 to the first reduction box 26. An end of the main body part 231 passes through the first reduction box 26 and is secured to the positioning sleeve 226, and the end of the main body part 231 is rotatable relative to the first reduction box 26.

The bracket 4 includes a base part 41, a force-transmission part 42 connected to the base part 41, and a guide rod 43 connected to the force-transmission part. The force-transmission part 42 substantively has a recessed shape, and includes a top wall 421, a bottom wall 422, and a side wall 423 connecting the top wall 421 to the bottom wall 422. The camera module also includes an elastic element 51 and a guide sleeve 52 that are fitted over the guide rod 43. For example, the elastic element 51 is an extension spring. Two ends of the elastic element 51 abut against the guide sleeve 52 and the bracket 4 (or the top wall 421) respectively. When the first driving assembly is not in operation, an end of the guide sleeve 52 away from the elastic element 51 abuts against the bottom wall 422. The guide sleeve 52 has a larger size at two ends thereof and a smaller size at s middle area thereof, such that the guide sleeve 52 has comparatively large areas in contacts with the elastic element 51 and the bottom wall 422, ensuring the stability of the contacts. The bracket 4 is also provided with a first guide part 44 and a second guide part 45 at two sides thereof, the first guide part 44 and the second guide part 45 are located at two sides of the body and configured to be fitted with a guiding structure provided on the body so as to guide the bracket 4, thereby ensuring the smoothness of the movement of the bracket 4.

Figure 4:
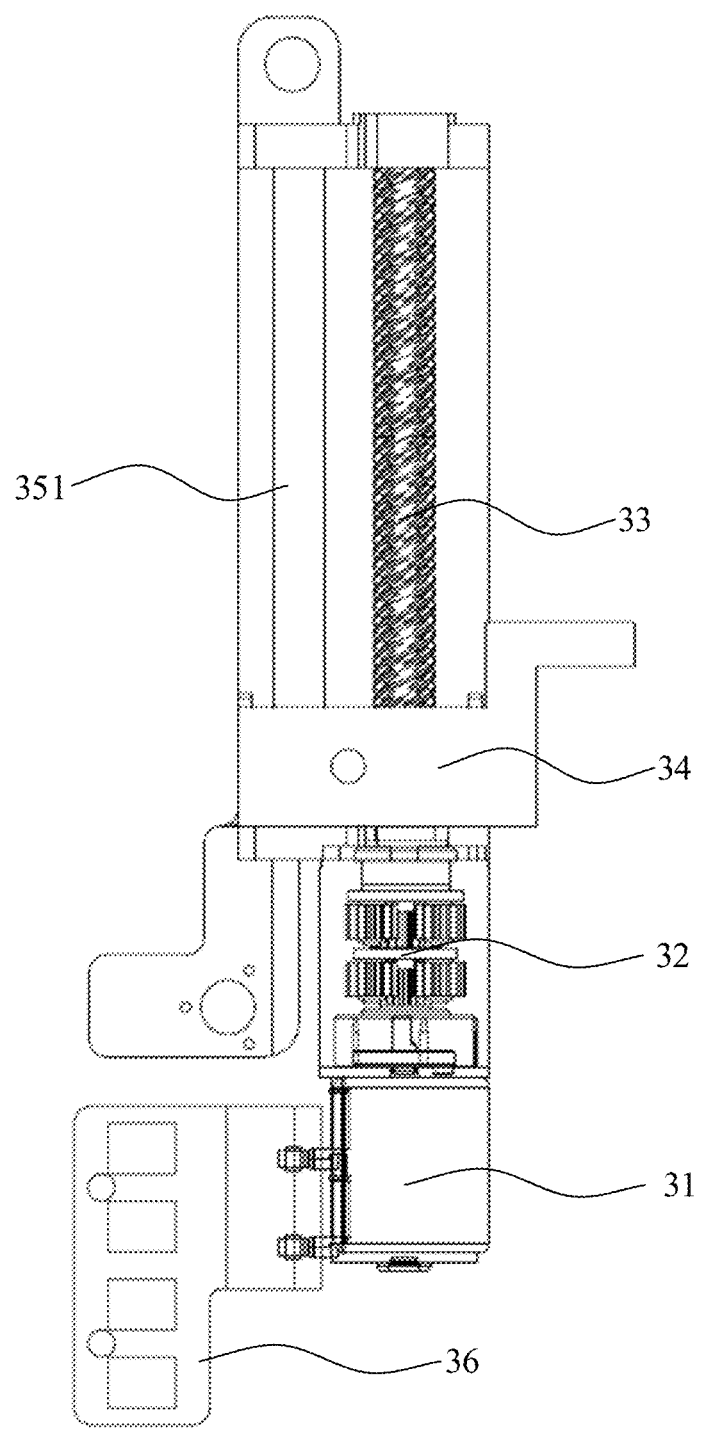
FIG. 4 is a front view of a second driving assembly of the camera module illustrated in FIG. 1.

With reference to FIG. 4, the second driving assembly 3 is configured to drive the bracket 4, the camera assembly 1, and the first driving assembly to move in the first direction X or an opposite direction of the first direction X. The second driving assembly 3 includes a second electric motor 31, a second transmission, and a second power output element 34. The second transmission drivingly connecting the second electric motor 31 to the second power output element 34, and the second electric motor 31 and the second transmission are mounted to the body through a second reduction box 35. The second driving assembly 3 also includes a second flexible printed circuit board 36 connected to the second electric motor 31. The second flexible printed circuit board 36 is configured to electrically couple the second electric motor 31 with the main board of the mobile phone to achieve electric power transmission and data transmission, and the main board controls the second electric motor 31 through the second flexible printed circuit board 36. The structure of the second electric motor 31 is similar to that of the first electric motor 21. It could be understood that, the first reduction box 26 and the second reduction box 35 include a casing of the electric motor and a casing of the reduction part, and can be manufactured by a powder metallurgy technology, holes and some parts need to be processed by a lathe or a CNC machining center.

Figure 5:
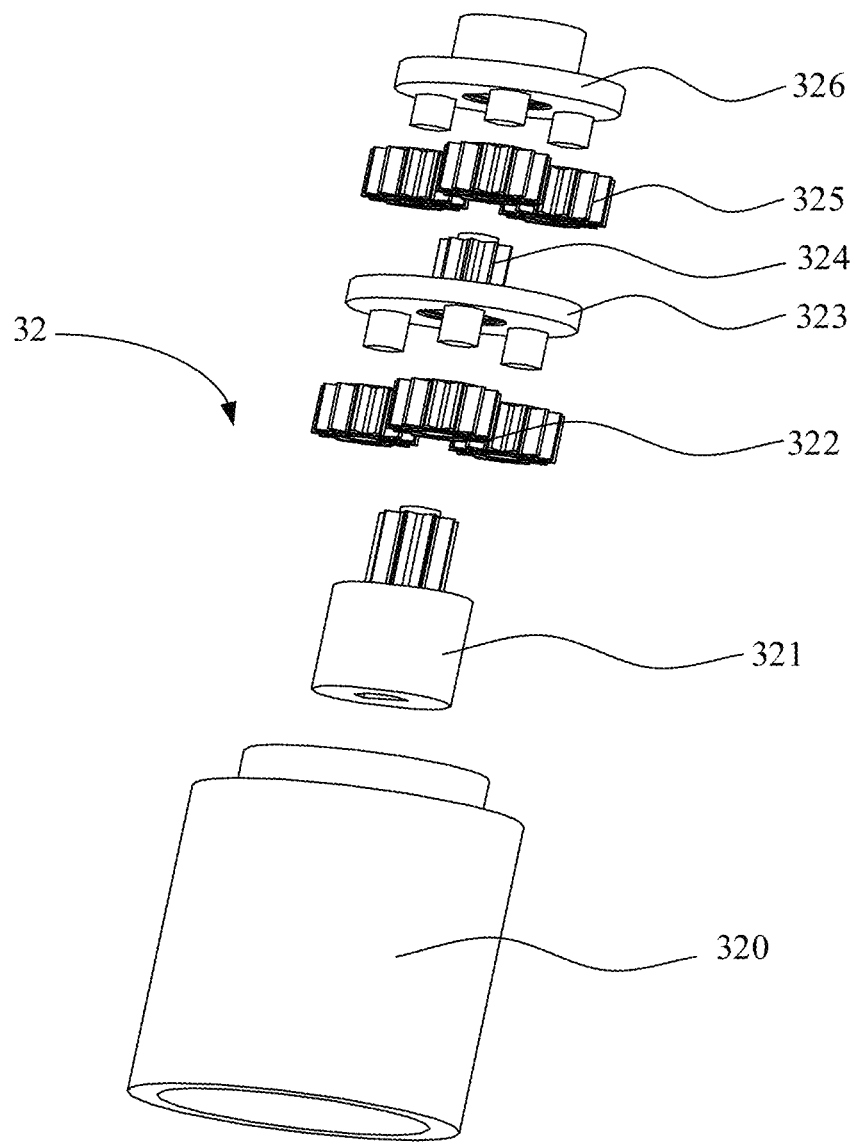
FIG. 5 is an exploded view of the second driving assembly illustrated in FIG. 4.
Figure 6:
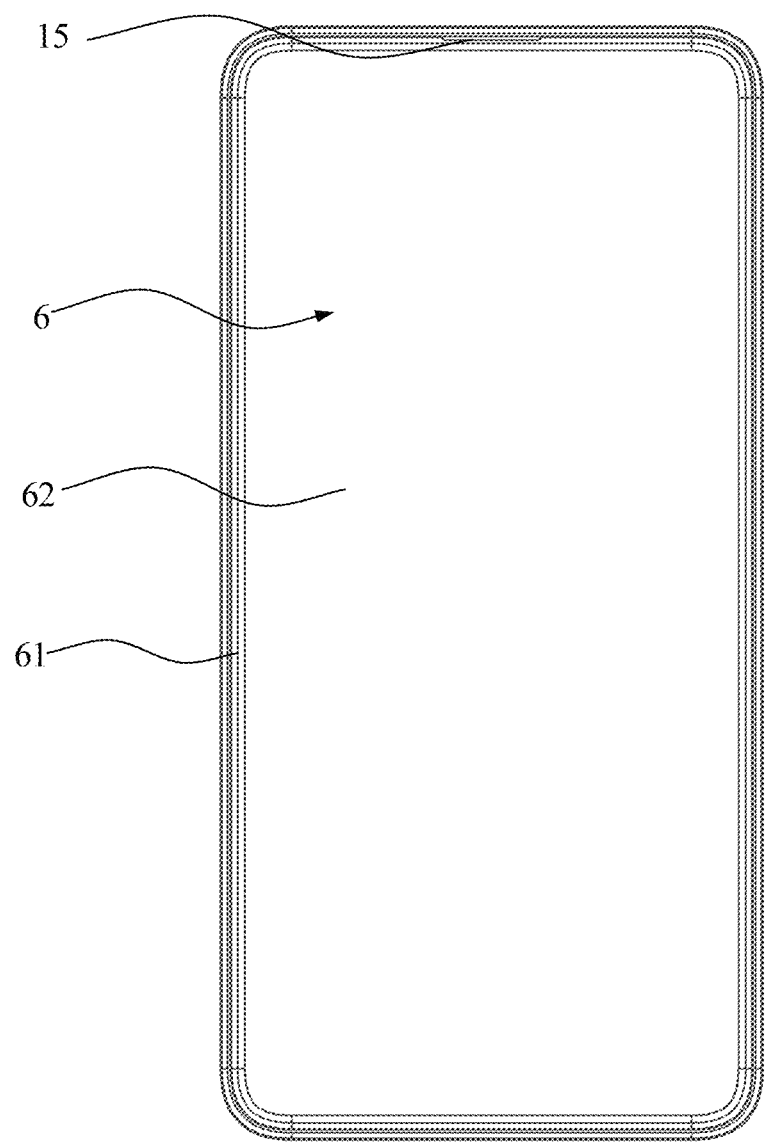
FIG. 6 is a front view of an embodiment of a terminal device of the present disclosure.
Figure 7:
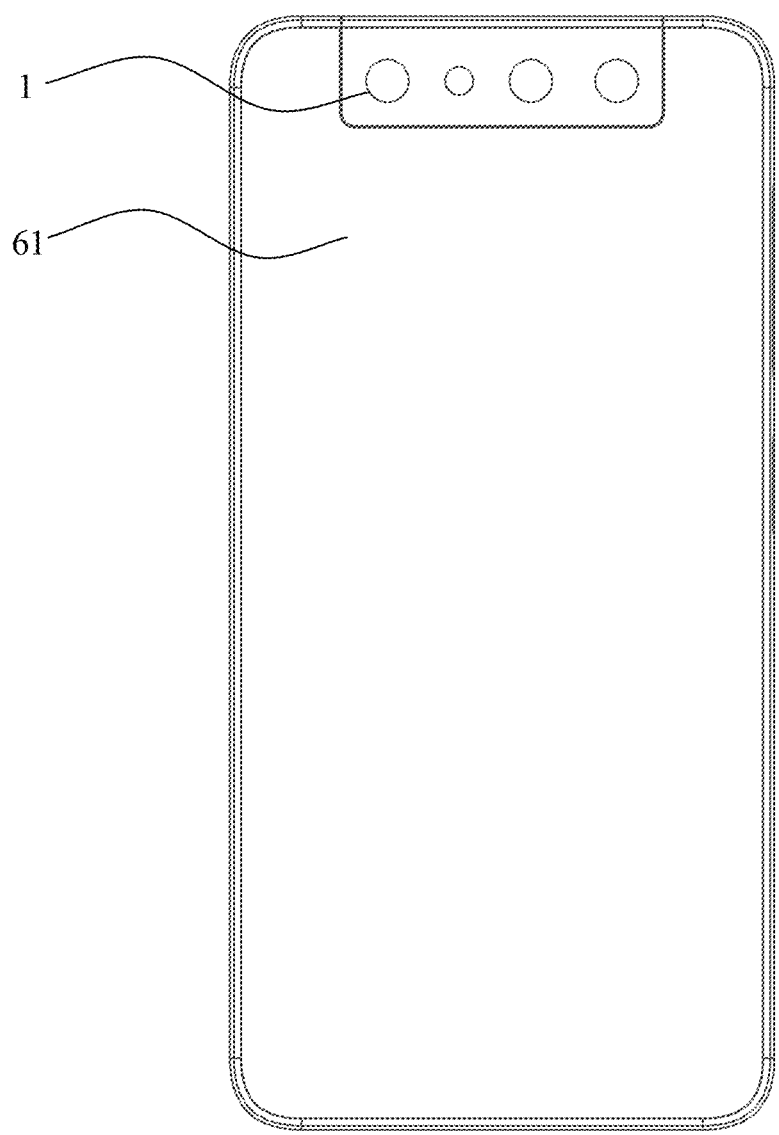
FIG. 7 is a rear view of the terminal device illustrated in FIG. 6.
Figure 8:
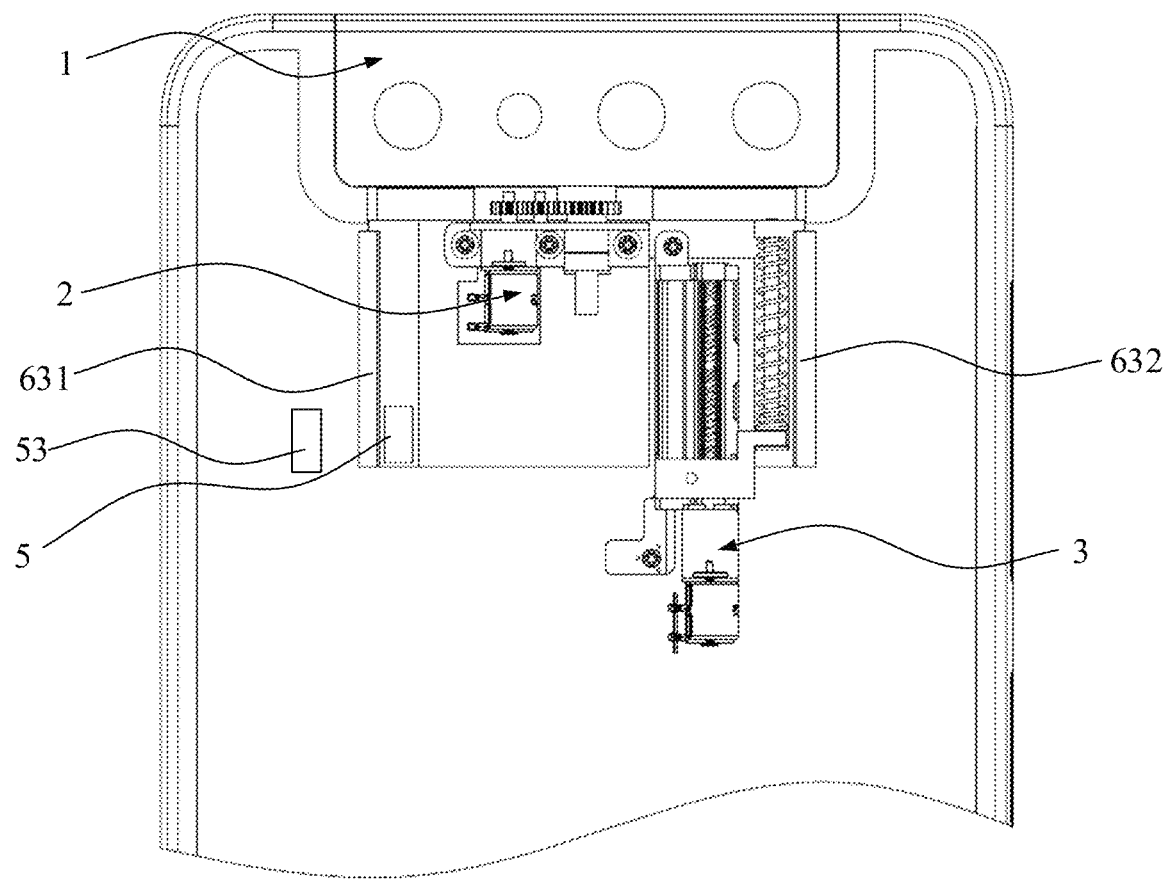
FIG. 8 is a partially rear view of the terminal device illustrated in FIG. 6, with a housing portion undergone a perspective treatment.

With reference to FIG. 5, the second transmission includes a second reduction part 32 and a leadscrew 33 connected to the second reduction part. The second reduction part 32 includes a gear ring 320, and a first sun gear 321, a first planet gear 322, a first planet carrier 323, a second sun gear 324, a second planet gear 325, and a second planet carrier 326 that are received in the gear ring. The gear ring 320 is fixed, and three first planet gears 322 and three second planet gears 325 are provided. The first sun gear 321 is secured to an electric motor shaft of the second electric motor 31, and the first planet gears 322 are rotatably mounted to the first planet carrier 323 and separately meshes with the first sun gear 321 and the gear ring 320. When the first sun gear 321 drives the first planet gears 322 to rotate under the driving of the electric motor shaft, the first planet gears 322 revolve while rotating. That is, the first planet carrier 323 is driven to rotate, such that the rotation from the electric motor shaft undergoes a first stage deceleration, and the first planet carrier 323 serves as a first stage deceleration output element. The second sun gear 324 is secured to the first planet carrier 323, and the second planet gears 325 are rotatably mounted to the second planet carrier 326 and separately meshes with the second sun gear 324 and the gear ring 320. When the second sun gear 324 drives the second planet gears 325 to rotate, the second planet gears 325 revolve while rotating. That is, the second planet carrier 326 is driven to rotate, thereby achieving a second stage deceleration. The second planet carrier 326 serves as a second stage deceleration output element, and the leadscrew 33 is secured to the second planet carrier 326, such that an output torque of the leadscrew 33 is raised, achieving the purpose of reducing the number of revolutions and increasing the torque.

In other embodiments, if the torque requirement for the leadscrew is not high, only one stage reduction part can be provided. In this case, the first planet carrier 323 is directly connected to the leadscrew 33. However, in the forgoing embodiment, the first planet carrier 323 is indirectly connected to the leadscrew 33 through the second sun gear 324, the second planet gears 325, and the second planet carrier 326. The structure of the first reduction part 221 is similar to that of the second reduction part 32, i.e. the first stage reduction part or the second stage reduction part can be employed.

The leadscrew 33 is rotatably mounted to the second reduction box 35 through a bearing. The second reduction box 35 further includes a guide column 351 parallel to the leadscrew 33. The second power output element 34 includes a force-receiving part 341 and a force-exerting part 342 connected to the force-receiving part. The force-exerting part 342 further defines a leadscrew guiding groove 343, the force-receiving part 341 is fitted over the guide column 351, and the leadscrew guiding groove 343 is fitted with the leadscrew 33. The force-exerting part 342 abuts against the guide sleeve 52, and when the first driving assembly is started, the force-exerting part applies a force to the guide sleeve and moves against an elastic force of the elastic element 51, such that the driving force is transmitted to the bracket 4 through the guide sleeve 52 and the elastic element 51. A rotation output by the second reduction part 32 can be converted into a linear movement of the second power output element 34 with fitting between the leadscrew 33 and the leadscrew guiding groove 343. The guide column 351 is configured to guide the second power output element 34, thereby ensuring the smoothness of its movement and further ensuring the smoothness of the movement of the camera assembly 1.

In some embodiments, the guide column 351 is made of stainless steel and has a smooth surface, such that the smoothness of the movement of the second power output element 34 can be further ensured, and meanwhile the resistance can be reduced. The second power output element 34 is made by double color injection with powder metallurgy and plastic, an engineering plastic having a self-lubrication effect is employed as the plastic, which also facilitates improving smoothness and reducing resistance. The leadscrew 33 is generally made of tool steel with high strength through multiple processes with the lathe or the machining center.

In another aspect, some embodiments of the present disclosure further provide a terminal device, which can include a body and a camera module according to any one of forgoing embodiments. The first direction can be understood as a length direction of the terminal device, and the second direction can be understood as a width direction of the terminal device. With reference to FIGS. 6 to 9, the body 6 includes a casing 61, and a display screen 62 and a support frame 63 that are mounted to the casing 61. The casing 61 can include a front casing, a rear casing, a middle frame, and other support structures. The second electric motor 31 can be secured to the support frame of the body by a threaded structure (a screw or bolt, and a nut). The body 6 is provided with a receiving part 60 located behind the display screen 62, and the receiving part 60 runs through a rear end face and an upper end face of the casing 61. In an initial state, the camera assembly 1, the first driving assembly 2, and the bracket 4 are accommodated in the receiving part 60. When the second driving assembly 3 drives the bracket to move in the first direction Y, the camera assembly 1 protrudes from the receiving part 60. When the second driving assembly 3 drives the bracket to move in the opposite direction of the first direction Y, the camera assembly 1 moves back into the receiving part 60. Certainly, the terminal device also includes a main board 64, a memory, a battery, and other components.

The support frame 63 is configured to support the bracket 4. The support frame 63 includes a base 631, and a first guide rail 632 and a second guide rail 633 located at two sides of the base 631. The first guide part 44 is slidably mounted to the first guide rail 632, the second guide part 45 is slidably mounted to the second guide rail 633, such that the support frame 63 can guide the bracket 4, and the smoothness of the movement of the bracket 4 and the first driving assembly mounted to the bracket can be ensured. Ends of the first guide rail 632 and the second guide rail 633 are further provided with stop structures for restricting a position of the bracket 4. In other embodiments, the first guide rail 632 and the second guide rail 633 can also be provided at other positions of the body 6, such as at the casing 61.

Figure 12:
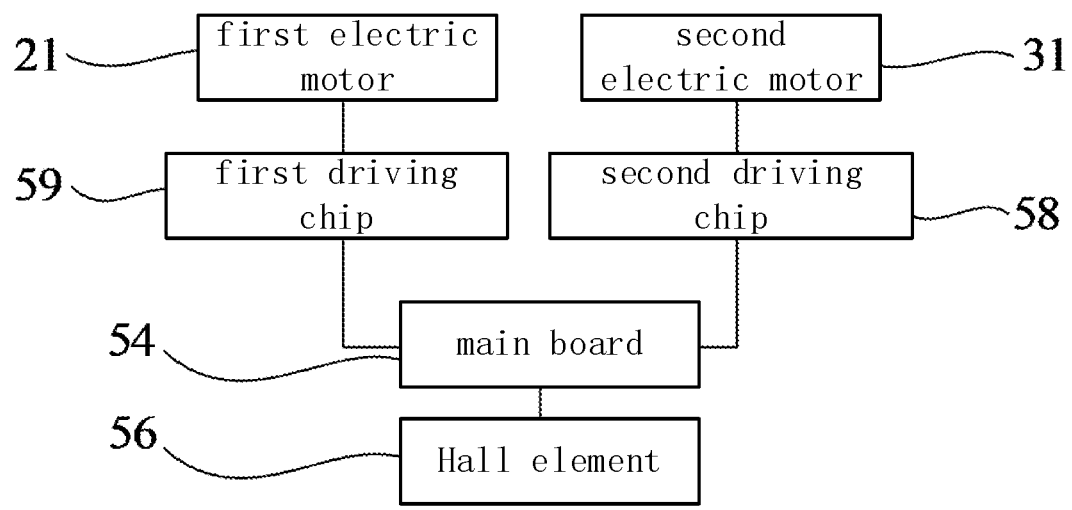
FIG. 12 is a block diagram illustrating controlling of an embodiment of a first electric motor and a second electric motor of a terminal device of the present disclosure.

With reference to FIG. 12, when a user wants to shoot the front of the display screen, he clicks an image capturing interface for front image capturing displayed on the display screen 62. The main board 54 of the terminal device sends a staring instruction for starting the second electric motor 31, and a second driving chip 58 of the second electric motor 31 starts the second electric motor 31 after receiving the instruction. The second electric motor 31 drives the second power output element 34 to move through the second transmission, and the second power output element 34 compresses the elastic element 51 and drives the bracket 4, the second driving assembly 3, and the camera assembly 1 to move in the first direction Y.

Figure 9:
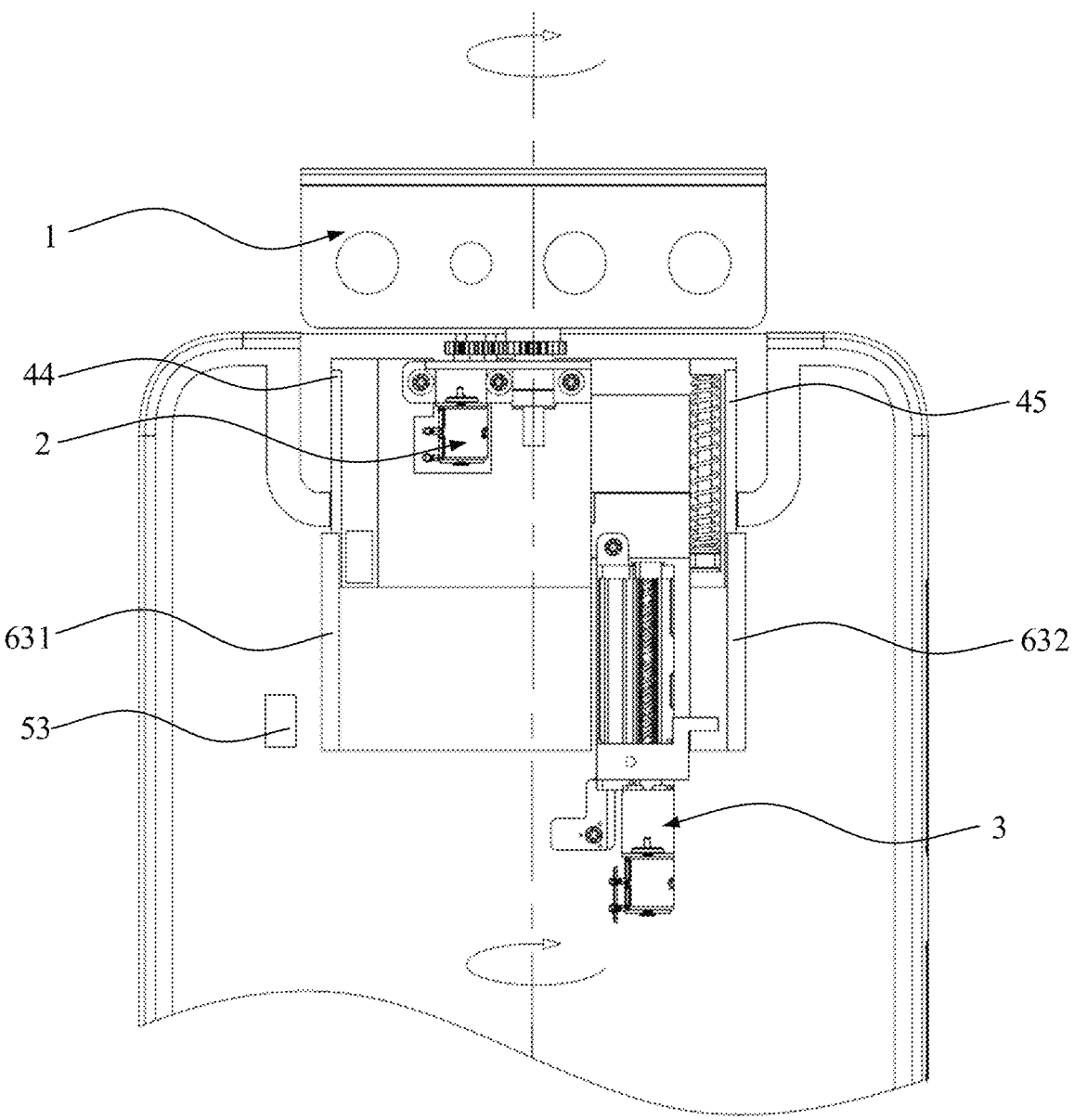
FIG. 9 is a partially rear view of the terminal device illustrated in FIG. 8, with a camera assembly protruding from a body.
Figure 10:
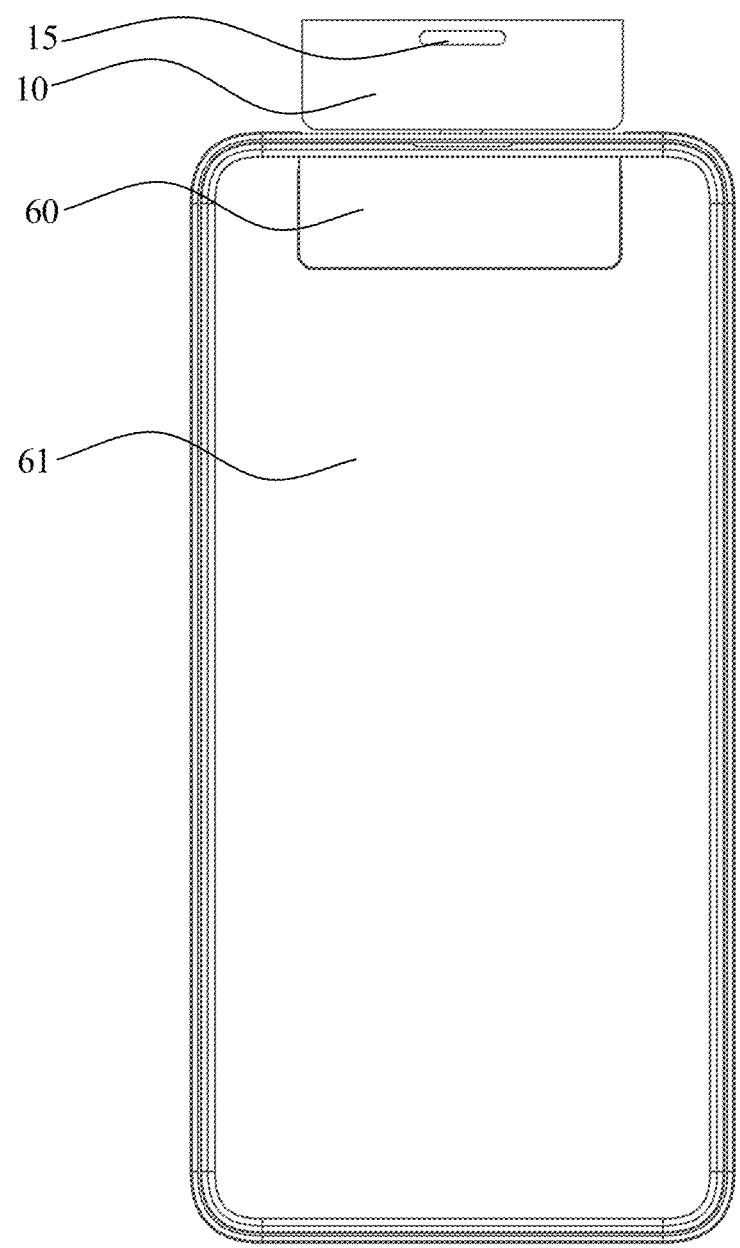
FIG. 10 is a rear view of the terminal device illustrated in FIG. 6, with a camera assembly protruding from a body and rotated by 180 degrees.
Figure 11:
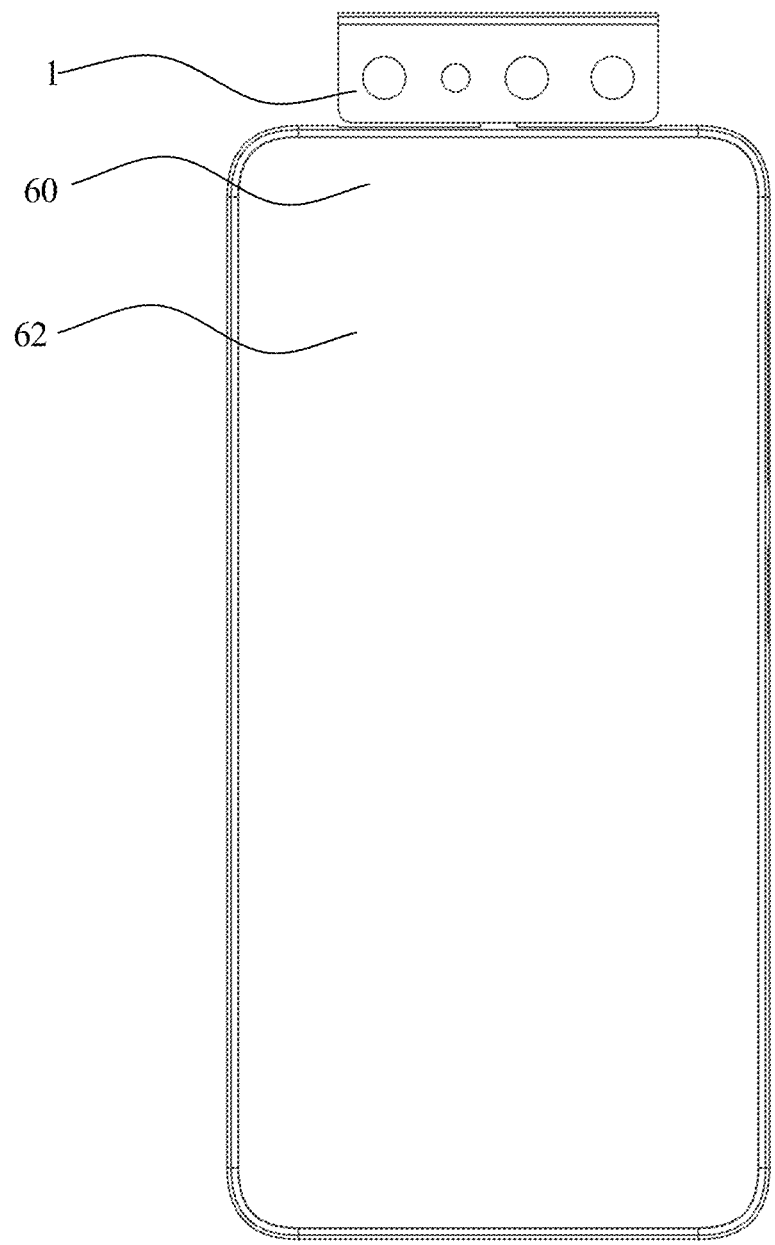
FIG. 11 is a front view of the terminal device illustrated in FIG. 6, with a camera assembly protruding from a body and rotated by 180 degrees.

When the camera assembly is moved to a preset position, it protrudes from the body 6, as illustrated in FIG. 9. A position of a magnet 27 changes accordingly, and a Hall element 56 senses the change of a magnetic field and triggers an in-place instruction and sends it to the main board 54 of the terminal device. The main board of the terminal device then sends an instruction to a first driving chip 59 of the first electric motor 21, the first driving chip of the first electric motor 21 starts the first electric motor 21 to drive the camera assembly 1 to rotate. When the camera assembly 1 is rotated by 180 degrees, it can be used as a front camera, as illustrated in FIGS. 10 and 11.

Since the first electric motor 21 is a stepping motor, the camera assembly 1 can be adjusted at any angle, i.e. at different image capturing angles, thereby satisfy different requirements of the user. When the user exits the image capturing interface for the front image capturing, the first electric motor 21 drives the camera assembly 1 to rotate to an initial position and trigger the second electric motor 31 to start, thereby driving the bracket 4, the first driving assembly 2, and the camera assembly 1 to move in the opposite direction of the first direction Y so as to move back into the receiving part 60.

Additionally, some embodiments of the present disclosure further provide an image capturing method for a terminal device according to any one of the forgoing embodiments. The image capturing method includes the following actions.

An instruction for a front image capturing function which is triggered by the user is acquired.

The second driving assembly is started to drive the camera assembly to move in the first direction to enable the camera assembly to at least partially protrude from the body.

In some embodiments, the first electric motor 11 is started after the user triggers the instruction for the front image capturing function, thereby driving the bracket 2, the second driving assembly 4, and the camera assembly 3 to move in the first direction Y.

The first driving assembly is started to drive the camera assembly to rotate by a preset angle, and the preset angle satisfies the front image capturing function.

The preset angle can be 180 degrees, and can also be a certain angle customized by the user, such that the terminal device can shoot the front at different angles. In the present embodiment, the preset angle is greater than 90 degrees, so as to ensure that the camera assembly can perform front image capturing.

A target image is captured with the camera assembly.

Thereby, the user can capture an image in front of terminal device through the camera assembly. Before the instruction for the front image capturing function is triggered, the user can capture an image behind the terminal device through the camera assembly.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A camera module, comprising:
a camera assembly;
a first driving assembly configured to drive the camera assembly to rotate and comprising a first electric motor, a first power output element, and a first transmission drivingly connecting the first electric motor to the first power output element, and the camera assembly being secured to the first power output element; and
a second driving assembly configured to drive the camera assembly and the first driving assembly to move in a first direction,
wherein the first transmission comprises a first reduction part connected to an electric motor shaft of the first electric motor and a gear set connected to the first reduction part, and the gear set is configured to transmit power from the first electric motor to the first power output element, and
wherein the gear set comprises a first gear and a second gear meshing with the first gear, the first power output element is provided with a toothed part, the toothed part meshes with the second gear, and the first gear, the second gear, and the toothed part are arranged in a second direction perpendicular to the first direction.

2. The camera module according to claim 1, wherein the first power output element comprises a main body part and a mounting part connected to the main body part, the toothed part extends in a circumferential direction of the main body part, and the mounting part is configured to be secured to the camera assembly.

3. The camera module according to claim 2, wherein the first driving assembly further comprises a first reduction box, the first reduction part is mounted in the first reduction box, and the first electric motor is mounted to the first reduction box.

4. The camera module according to claim 3, wherein the first driving assembly further comprises a positioning sleeve configured to mount the first power output element to the first reduction box, an end of the main body part passes through the first reduction box and is secured to the positioning sleeve.

5. The camera module according to claim 1, wherein a rotating axis of the camera assembly extends in the first direction.

6. The camera module according to claim 5, wherein the camera assembly comprises a camera and a cable electrically coupled with the camera, the first power output element defines a through hole for the cable to pass through, and the through hole extends in the first direction and the rotating axis of the camera assembly passes through the through hole.

7. The camera module according to claim 5, wherein the camera assembly comprises at least two cameras arranged in the second direction.

8. The camera module according to claim 1, wherein the camera module comprises a bracket, a receiver, and a flash lamp, the first driving assembly is mounted to the bracket, and the receiver and the flash lamp are mounted to the camera assembly or the bracket.

9. The camera module according to claim 1, wherein the camera module comprises a bracket, the first electric motor is secured to the bracket by a threaded structure, and the second driving assembly comprises a second electric motor, a second transmission, and a second power output element, wherein the second transmission drivingly connects the second electric motor to the second power output element, and the second power output element is configured to drive the bracket to move in the first direction or in an opposite direction of the first direction.

10. The camera module according to claim 9, wherein the second transmission comprises a gear ring and a sun gear, a planet gear, and a planet carrier received in the gear ring, the sun gear is secured to an electric motor shaft of the second electric motor, the planet gear separately meshes with the sun gear and the gear ring, the planet gear is rotatably mounted to the planet carrier, and the planet gear revolves while rotating to drive the planet carrier to rotate.

11. The camera module according to claim 10, wherein the second transmission comprises a leadscrew secured to the planet carrier, the second power output element comprises a force-receiving part and a force-exerting part, the force-receiving part comprises a leadscrew guiding groove fitted with the leadscrew, and the force-exerting part is configured to drive the bracket.

12. The camera module according to claim 11, wherein the bracket comprises a guide rod, the camera module comprises an elastic element and a guide sleeve that are fitted over the guide rod, two ends of the elastic element abut against the guide sleeve and the bracket respectively, and the force-exerting part abuts against the guide sleeve.

13. A terminal device, comprising:
a body comprising a casing and a support frame mounted to the casing; and
a camera module comprising:
a bracket connected to the support frame,
a camera assembly,
a first driving assembly configured to drive the camera assembly to rotate and comprising a first electric motor, a first power output element, a first transmission, and a first reduction part, wherein the first electric motor, the first power output element, and the first transmission are mounted to the first reduction part, and the camera assembly is secured to the first power output element; and
a second driving assembly configured to drive the camera assembly to enable the camera assembly to at least partially protrude from the body and comprising a second electric motor secured to the body through a threaded structure,
wherein the first transmission comprises a gear set connected to the first reduction part, and the gear set is configured to transmit power from the first electric motor to the first power output element, and
wherein the gear set comprises a first gear and a second gear meshing with the first gear, the first power output element is provided with a toothed part, the toothed part meshes with the second gear, and the first gear, the second gear, and the toothed part are arranged in a width direction of the terminal device.

14. The terminal device according to claim 13, wherein the support frame comprises a first guide rail and a second guide rail, the bracket comprises a first guide part and a second guide part, the first guide part is slidably mounted to the first guide rail, and the second guide part is slidably mounted to the second guide rail.

15. The terminal device according to claim 13, wherein the body comprises a main board, and the camera module comprises a first flexible printed circuit board and a second flexible printed circuit board, wherein the first flexible printed circuit board is electrically coupled with the first electric motor and the main board, the second flexible printed circuit board is electrically coupled with the second electric motor and the main board, and the main board controls the first electric motor and the second electric motor through the first flexible printed circuit board and the second flexible printed circuit board respectively.

16. The terminal device according to claim 13, further comprising a display screen, wherein the body is provided with a receiving part located behind the display screen, and the receiving part runs through a rear end face and an upper end face of the casing, the camera assembly is capable of protruding from the receiving part and moving back into the receiving part; wherein the second driving assembly comprises the second electric motor, a second power output element, a second transmission, and a second reduction part, and the second electric motor, the second power output element, and the second transmission are mounted to the second reduction part.

17. An image capturing method for a terminal device comprising a body and a camera module, wherein the camera module comprises: a camera assembly; a first driving assembly configured to drive the camera assembly to rotate and comprising a first electric motor, a first power output element, and a first transmission drivingly connecting the first electric motor to the first power output element, and the camera assembly being secured to the first power output element; and a second driving assembly configured to drive the camera assembly and the first driving assembly to move in a first direction, wherein the first transmission comprises a first reduction part connected to an electric motor shaft of the first electric motor and a gear set connected to the first reduction part, and the gear set is configured to transmit power from the first electric motor to the first power output element, and wherein the gear set comprises a first gear and a second gear meshing with the first gear, the first power output element is provided with a toothed part, the toothed part meshes with the second gear, and the first gear, the second gear, and the toothed part are arranged in a second direction perpendicular to the first direction, the image capturing method comprising:

acquiring an instruction for a front image capturing function triggered by a user;

starting the second driving assembly to drive the camera assembly to move in the first direction to enable the camera assembly to at least partially protrude from the body;

starting the first driving assembly to drive the camera assembly to rotate by a preset angle, the preset angle satisfying the front image capturing function; and capturing a target image with the camera assembly.

\* \* \* \* \*